(12) United States Patent
Kitamura et al.

(10) Patent No.: US 6,560,824 B1
(45) Date of Patent: May 13, 2003

(54) BOOT-BAND (75) Inventors: Yoshiharu Kitamura, Komagane (JP); Yoshihiro Hemmi, Komagane (JP); Takashi Ogino, Komagane (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 09/959,900

(22) PCT Filed: May 12, 2000

(86) PCT No.: PCT/JP00/03072

§ 371 (c)(1),
(2), (4) Date: Nov. 13, 2001

(87) PCT Pub. No.: WO00/70260

PCT Pub. Date: Nov. 23, 2000

(30) Foreign Application Priority Data

May 14, 1999 (JP) ............................................. 11-134803

(51) Int. Cl.⁷ ............................................... B65D 63/04
(52) U.S. Cl. ................................... 24/20 CW; 24/20 R
(58) Field of Search ........................... 24/20 R, 20 CW, 24/23 W, 23 EE, 22

(56) References Cited

U.S. PATENT DOCUMENTS

| | | | | |
|---|---|---|---|---|
| 4,222,155 A | * | 9/1980 | Oetiker | 24/20 R |
| 4,430,775 A | * | 2/1984 | Arthur | 24/20 CW |
| 5,537,721 A | * | 7/1996 | Oetiker | 24/20 R |
| 5,548,872 A | * | 8/1996 | Ortiker | 24/20 CW |
| 5,564,167 A | * | 10/1996 | Oetiker | 24/20 CW |

FOREIGN PATENT DOCUMENTS

| | | |
|---|---|---|
| JP | 55-152993 | 11/1980 |
| JP | 60-138089 | 9/1985 |
| JP | 63-172085 | 7/1988 |

\* cited by examiner

*Primary Examiner*—Robert J. Sandy
(74) *Attorney, Agent, or Firm*—Lowe Hauptman Gilman & Berner, LLP (57) ABSTRACT

A boot-band, of which the ear portion is highly rigid, that lowers the prominence of the ear portion. An outer overlap portion and an inner overlap portion are fixed together by inserting hooking claws into holes, with the band-body being curled into the shape of a ring. In a region of the band-body in the circumferential direction is formed an ear portion that has a pair of outwardly prominent leg portions and a bridge portion that connects the leg portions. At the opposite ends of the bridge portion, along a line that is perpendicular to the circumference, are formed rib-like parts that are inwardly bent and between which is formed a dowel portion. The rib-like parts are so arc-shaped that the inward prominence, which protrudes into the ear portion, increases toward the middle of the bridge portion in the clamping direction. The length of the rib-like parts is not long enough for the rib-like parts to reach the curved portions, but is 60% or more of the length of the bridge portion.

1 Claim, 7 Drawing Sheets

BOOT-BAND

FIELD OF THE INVENTION

This invention relates to a boot-band, such as one made of rubber, resin, or the like, for fixing a boot, on a connecting member.

BACKGROUND OF THE INVENTION

A boot-band, such as one made of rubber or resin, has been used as a part of automobiles and the like. The kind of boots discussed in the present specification include hollow cylindrical members, such as a hose or a tube. To fix this kind of boot on a mating member, a boot-band made of a metallic, belt-shaped member has been used. Previous models of this kind of boot-band, such as those described in Japanese Utility Model Publication No. H2-9195 or Japanese Patent No. 2538554, have been known.

The aforementioned previous models are referred to as bands of a caulking type. A band of this type has a metallic, belt-shaped band-body, which is curled into the shape of a ring. A hooking claw formed on the inner overlap portion of the band-body is to be hooked over the hole formed in the outer overlap portion. The ear portion of the band-body is plastically deformed by a jig under the condition that the hooking claw is hooked over the hole. In this way, the circumference of the band body of a band of this type is reduced, resulting in a design that provides the band-body with a binding power to clamp the member to be clamped.

In the case of such caulking-type boot-bands, higher rigidity of the ear portion is desirable because of the more-or-less spring-back that arises in the ear portion, even if the plastic deformation of the ear portion has reduced the circumference of the boot band to the desired level. For this reason, the aforementioned band of Japanese Utility Model Publication No. H2-9195 forms outwardly prominent, rib-like parts that protrude at the opposite ends of the ear portion along a line that is perpendicular to the circumference, as well as a dowel portion that sinks inwardly between the rib-like parts. In a similar but slightly different manner, the aforementioned band of Japanese Patent Publication No. 2538554 forms a shallow, dish-like sinking inwardly at the center of the bridge portion on the flat-shaped ear portion.

The aforementioned band of Japanese Utility Model Publication No. H2-9195 has a problem in that the outward prominence of the ear portion becomes too large because the whole ear portion buckles in an omega-shape when the ear portion is plastically deformed by a clamping tool to clamp the band. In order to make the ear portion less prominent, the upward deformation of the ear portion should be controlled by use of an improved clamping tool. In this case, however, there is a different problem, in that the loading that is necessary to deform (clamp) the ear portion is increased and the tool that is used accordingly needs to be larger and more specialized.

In contrast, the aforementioned band of Japanese Patent No. 2538554 has a problem that the whole ear portion is deformed to an omega-shape when clamped with a tool, especially with the opposite ends of the bridge portion being outwardly prominent, and with the amount of resilient deformation in the expanding direction of the band being increased. This is because the shallow, dish-like sinking on the ear portion does not result in high rigidity of the ear portion. In the case of a band of this kind, a larger clamping stroke could be obtained with an ear portion that is longer in the clamping direction. However, it has been actually impossible to make a longer ear portion, because a longer bridge portion causes the maximum height of the ear portion to be higher after the plastic deformation.

It should be noted that a more-rigid ear portion does not necessarily mean a better one. Too rigid a bridge portion can cause the leg portions to be more deformed than any other portion, and, consequently, the leg portions might be subject to more stress. Because the leg portions are damaged or thinned, the ear portion is weaker as a whole.

The object of the present invention, therefore, is to provide a boot-band whose ear portion is more rigid and less prominent after its deformation, and whose leg portions are prevented from being damaged.

SUMMARY OF THE INVENTION

To achieve the aforementioned object, the present invention is a metal boot-band that is belt-shaped, and whose band-body is curled into the shape of a ring to be set on a member that is to be clamped, and that is principally characterized in that it is equipped with (1) fixing portions that lock the outer overlap portion to the inner overlap portion of the band-body, and (2) an ear portion that can be plastically formed into a shape that reduces the circumference of the band-body, and that has (a) a pair of leg portions that protrude outward and that are formed in the circumferential direction on said band-body, and (b) a bridge portion that links the leg portions, and that in said ear portion are formed [1] rib-like parts that are inwardly bent at the opposite ends of the bridge portion, and [2] a dowel portion that inwardly sinks between the rib-like parts. Said rib-like parts have an arc-shape so that their inward prominence increases toward the middle of the bridge portion in the clamping direction, and they have a length that is 60% or more of the length of the bridge portion in the clamping direction, but not more than the length obtained by subtracting the length of the curved portion at the opposite ends of the bridge portion from the length of the bridge portion in the clamping direction. Said dowel, portion has a length that is as long as, or longer than, the length of the rib-like parts.

In the case of the boot-band of the present invention, which is composed of the aforementioned parts, it is possible to reduce the winding diameter or circumference of the band-body by forming the ear portion with a clamping tool. In the ear portion, mainly the leg portions are so formed because the other parts are made more rigid by the rib-like parts and the dowel portion. Because the rib-like parts have a length that is 60% or more of the length of the bridge portion in the clamping direction, but not more than the length obtained by subtracting the length of the curved portion at the opposite ends of the bridge portion from the length of the bridge portion in the clamping direction, and because the dowel portion has a length that is as long as, or longer than, the length of the rib-like parts, the rigidity decreases from the middle of the bridge portion in the clamping direction toward the leg portions, whereby the rigidity is prevented from changing excessively between the leg portions and the bridge portion.

DESCRIPTION OF THE PREFERRED EMBODIMENTS

One embodiment of the present invention will now be described, with reference to FIGS. 1 through 10.

The boot-band 10 has a band-body 11 made of a belt-shaped metal (such as stainless steel) member. The longitudinal ends of the band-body 11 are the first end 13, which is loose, and the second end 14. This band-body 11 is rolled into a ring shape around the clamped member 17 so that the first end 13 is situated on the external surface. One example of the clamped member 17 is a rubber boot, which is set around a cylindrical connected member 18 in a power-transmission system of an automobile.

The band-body 11, which is curled into the shape of a ring, has an outer overlap portion 21, which is begins at the first end 13 of the band body 11, an inner overlap portion 22, which ends at the second end 14 of the band body 11, and an intermediate portion 23 (which neither overlaps nor is overlapped), which is situated between the overlap portions 21 and 22. It is preferable that the band-body 11 be previously molded into the shape of a ring.

On the intermediate portion 23 is formed an ear portion 30 for clamping. The ear portion 30 contains a pair of front and rear leg portions 31 and 32 that are erected on the outer circumferential surface of the band-body, and a bridge portion 33 between these leg portions 31 and 32. The ear portion 30 is so designed that its shape will make it possible for it to decrease the inner diameter of the band-body 11. At the opposite ends of the bridge portion 33 in the clamping direction, which are regions continuous to the tops of the leg portions 31 and 32, are formed curved portions (round-corner portions) 34 and 35, which curve toward the leg portions 31 and 32 in an arc shape.

To provide the ear portion 30 with more rigidity, multiple pairs of rib-like parts 36, each of which is inwardly bent by a press or the like (so-called flare working) into the ear portion 30, are formed at the opposite ends of the bridge portion 33 along a line perpendicular to the circumference. Between each pair of rib-like parts 36 is formed a dowel portion 37, which is inwardly sunk into the ear portion 30 by a press or the like.

Figure 2:
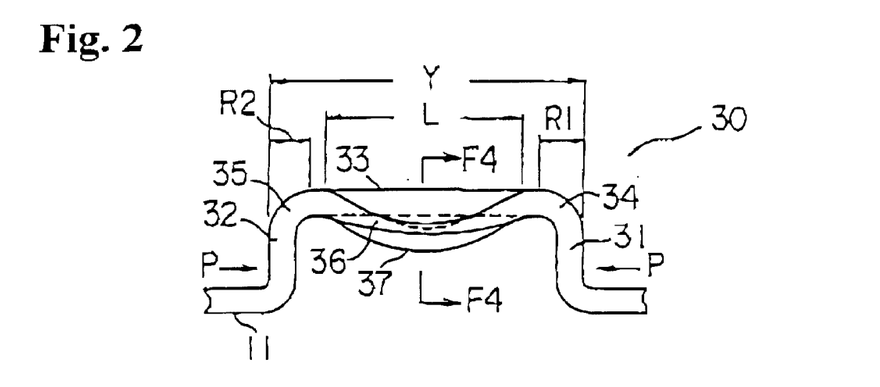
FIG. 2 is a side view of the ear portion of the boot-band shown in FIG. 1.

As is illustrated in FIG. 2, the rib-like parts 36, if viewed from a side of the band 10, have a convex shape like a U-shaped arc such that the inward prominence of the parts grows larger toward the middle of the bridge portion 33 in the clamping direction. Therefore, the bridge portion 33 is most rigid in its middle in the clamping direction, and the rigidity decreases toward the leg portions 31 and 32.

The length L of the rib-like parts 36 is so designed that the ends of the rib-like parts 36 do not reach the curved portions 34 and 35. As a result, when the ear portion 30 is plastically deformed, the bridge portion 33 is not very strong as compared with the leg portions 31 and 32. This makes it possible to prevent the leg portions 31 and 32 from damage that is caused by the stretches localized in the leg portions 31 and 32. In other words, the length L of the rib-like parts 36 is shorter than the length of the portion that results if the lengths (R1+R2) of the curved portions 34 and 35 are subtracted from the length Y of the bridge portion 33 in the clamping direction. Moreover, the length L of the rib-like parts 36 is 60% or more of that of the bridge portion 33 in the clamping direction. This secures the rigidity of the bridge portion, and reduces the maximum height of the ear portion 30 after it is plastically deformed.

Figure 3:
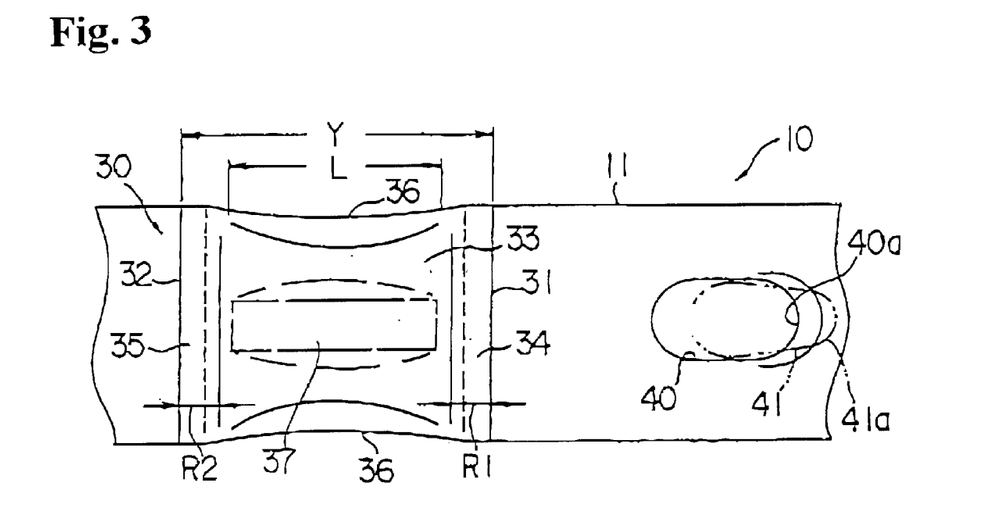
FIG. 3 is a plan view of the ear portion, and the area surrounding it, of the boot-band shown in FIG. 1.
Figure 4:
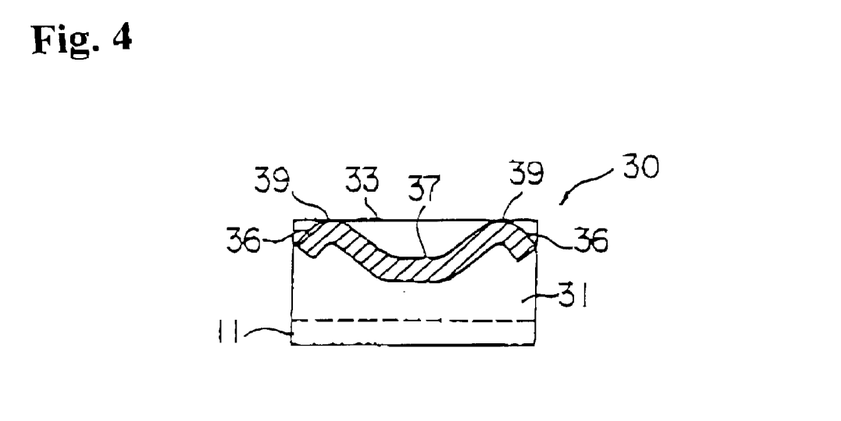
FIG. 4 is a cross-section view along the line F4—F4 of FIG. 2.

The dowel portion 37, in contrast, is formed having the constant width in the middle of the bridge portion 33 on a line perpendicular to the circumference so as to extend in the clamping direction of the band-body 11, as is shown in FIG. 3 and other drawings. The length of the dowel portion 37 in the clamping direction is as long as, or longer than, the aforementioned length L of the rib-like parts 36. Because of the formation of the rib-like parts 36 and the dowel portion 37, the transverse cross-section of the bridge portion 33, if taken along the perpendicular line to the circumference, is roughly M-shaped, as is shown in FIG. 4. It is desirable that the height of the connecting regions 39, which connect the rib-like parts 36 with the dowel portion 37, should be approximately the height of the ear portion 30 that is not subject to the plastic deformation.

In a number of places (three, for example) of the outer overlap portion 21 of the band-body 11, near the first end 13, hooking holes 40 are formed along the longitudinal center-line of the band-body 11. These hooking holes 40 penetrate the strip of the band-body 11 in the thickness direction. On the inner overlap portion 22, at locations corresponding to those of each hooking hole, a number (three, in the drawings) of hooking claws 41 are formed. Each of the hooking claws 41 is prominent toward the outer overlap portion 21, so that each hooking claw 41 is inserted into the corresponding hooking hole 40. These hooking holes 40 and hooking claws 41 are example of the fixing portions to be used in the present invention.

The tip portion 41a of the hooking claw 41 overhangs aslant so as to be prominent toward the first end 13. Accordingly, this hooking claw 41, with its tip portion 41a being hooked over the brim portion 40a of the hooking hole 40, prevents the outer overlap portion 21 from separating from the inner overlap portion 22.

The assembling process and the like of the aforementioned boot-band 10 will now be described as follows.

Figure 1:
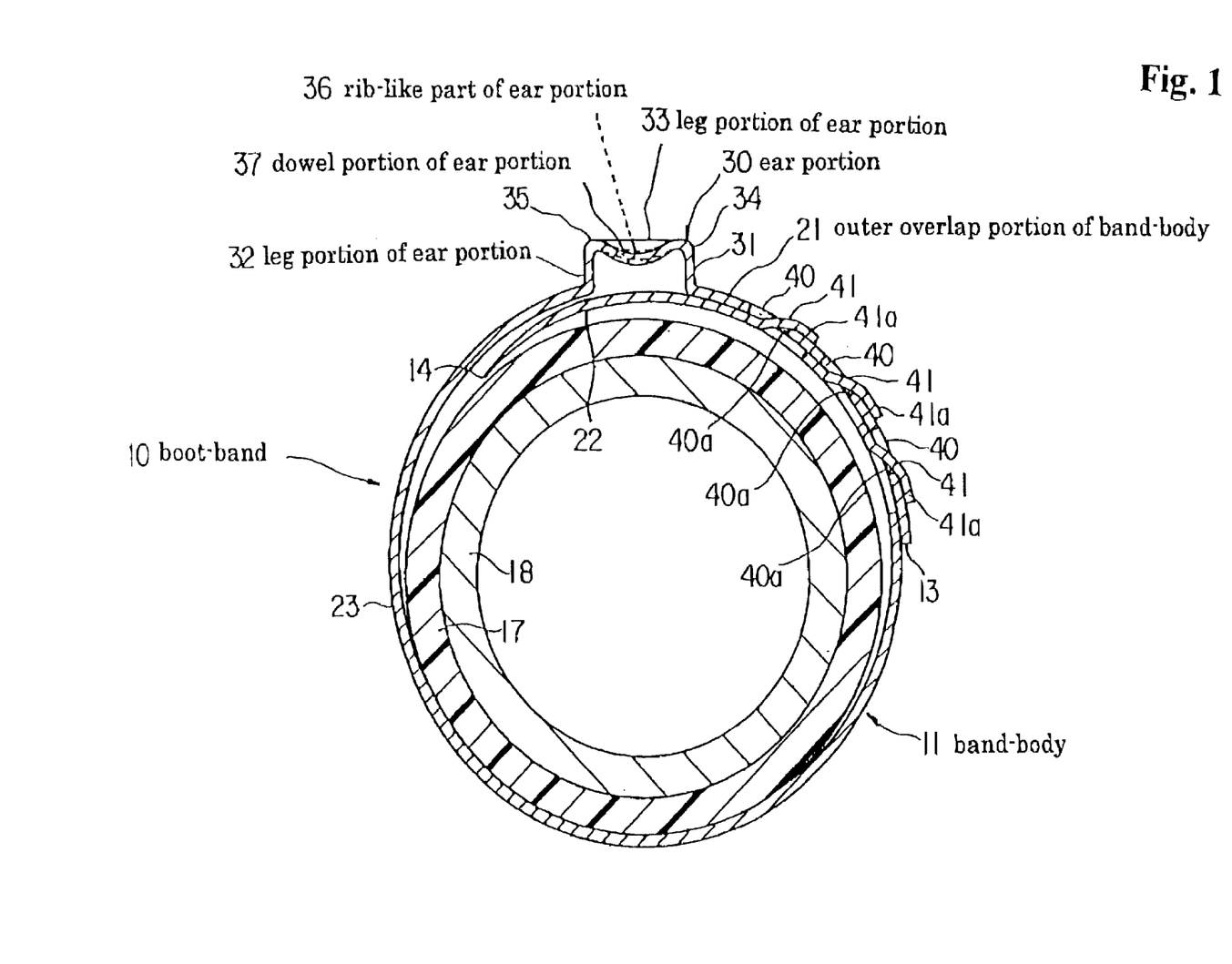
FIG. 1 is a section view illustrating a boot-band, which embodies the concept of the present invention, before clamping.

As shown in FIG. 1, on the connected member 18 is put the clamped member 17, around which is wound the boot-band 10 previously curled. Then the hooking claws 41 are inserted into the hooking holes 40.

This boot-band 10 tends to extend its winding diameter with the elastic restitution power of the band-body 11. This causes the tip portion 41a of the hooking claw 41 to hook over the brim portion 40a of the hooking hole 40, preventing the winding diameter of the band-body 11 from more extension. In this way, the boot-band 10 keeps its temporary fixation on the mating member 17, as shown in FIG. 1.

Figure 5:
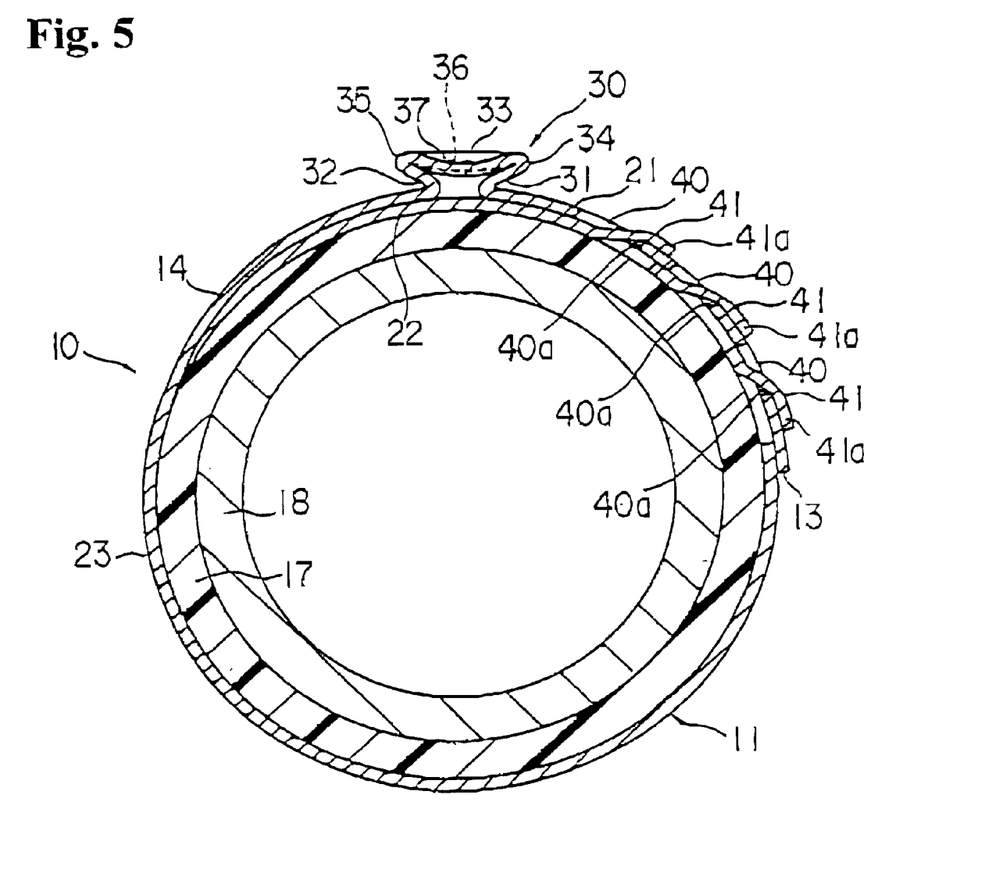
FIG. 5 is a section view of the boot-band represented in FIG. 1, after clamping.
Figure 6:
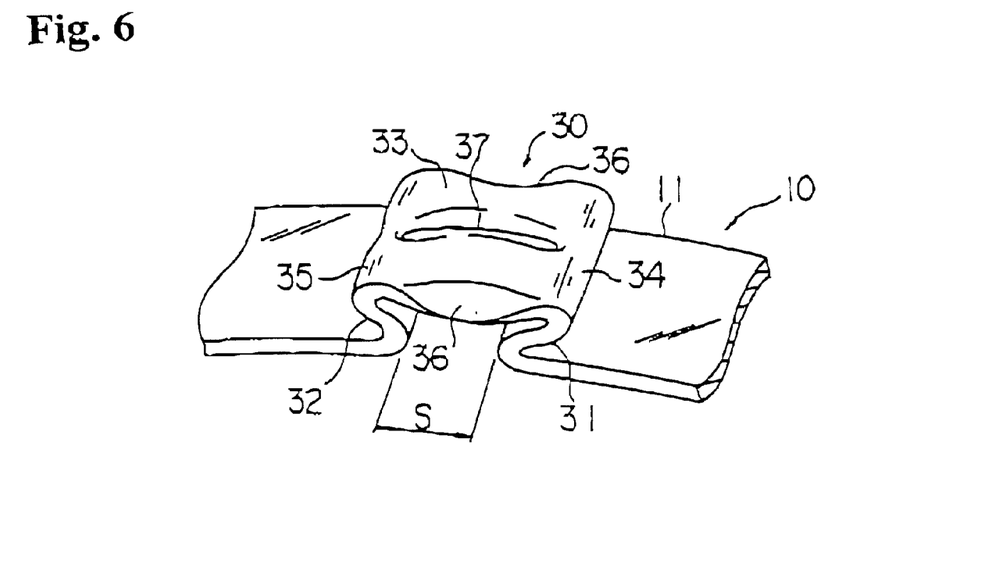
FIG. 6 is perspective view of the ear portion of the boot-band represented in FIG. 5.

To the leg portions 31 and 32 is applied a caulking load, by the clamping jig not illustrated in the drawing (such as pincers-like tools or an automatic caulking machine), in the direction the arrow indicates in FIG. 2. The leg portions 31 and 32 and the curved portions 34 and 35, which are relatively less rigid than the bridge portion 33, are more subject to plastic deformation caused by this caulking load P. As a result, the whole ear portion is deformed plastically as illustrated in FIG. 5 and FIG. 6, that is to say, the leg portions 31 and 32 are the most subject to the plastic deformation while the curved portions 34 and 35 are only a little deformed.

In this case, the rigidity changing of the bridge portion 33, near the curved portions 34 and 35, is relatively mild because the influence of the rigidity increase is reduced by the rib-like parts 36. This prevents the deformation from being too localized. The connecting regions 39, which, connect the rib-like parts 36 and the dowel portion 37, are around the height of the ear portion which is not subject to plastic deformation, and the bridge portion 33 is almost flat. This particularly lowers the height of the ear portion. To protect the leg portions 31 and 32 from damages caused by the plastic deformation of the ear portion 30, as mentioned before, it is desirable to prevent sharp changing of rigidity around the regions from the leg portions 31 and 32 through the bridge portion 33. For this purpose, in this embodiment, the width of the dowel portion 37 is designed to be equal across its entire length, and also the dowel portion 37 is designed so that its length in the longitudinal direction of the band is as long as, or longer than, that of the rib-like parts 36. As a result, it is possible to gradually increase the rigidity of the dowel portion 37 from the leg portions 31 and 32 to the bridge portion 33; rigidity is slightly increased in the dowel portion 37 first, and then, rigidity is increased in the rib-like parts 36.

In this way, the plastic deformation of the ear portion 30 into the desired shape reduces the winding diameter or circumference of the band-body 11 and it also maintains the deformed shape of the ear portion 30 or the reduced circumference even after unloading of the caulking load. Therefore, the clamped member 17 is bonded tight on the connected member 18 by the band-body 11.

Figure 7:
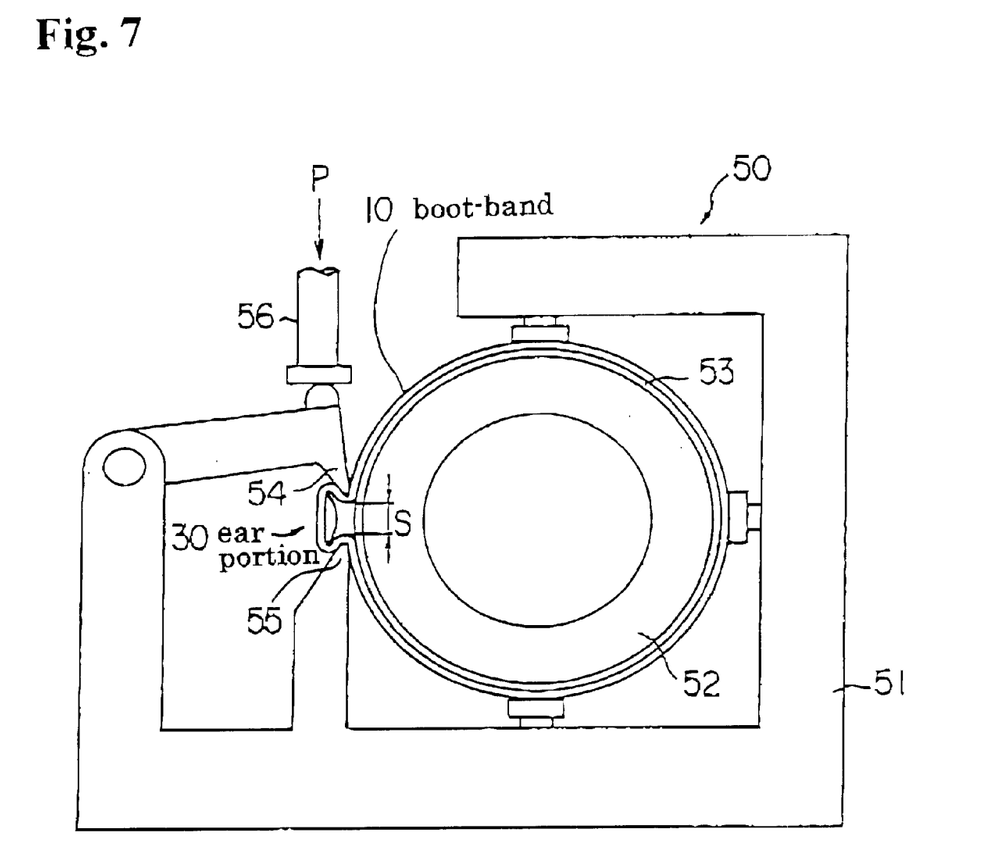
FIG. 7 is a side view of a caulking tester used to deform the ear portion plastically.

To examine the performance of boot-bands that embody the present invention, the ear portions 30 were plastically deformed by a caulking tester 50, as shown in FIG. 7. The results of the 3 Embodiment Models 1, 2, and 3 are compared with those of Comparison Models 1, 2, and 3 with regard to the following evaluating criteria. In one example of the caulking tester 50, a resin boot 53 covers the circumference of a rigid cylindrical member 52 installed inside a frame 51, and also a boot-band is attached outside the boot 53. The ear portion 30 is put between the acute heads of the clamping claws 54 and 55, and a caulking load P is applied to the pressure member 56 through a load-cell, which is not illustrated in the drawing. With this device, the leg portions 31 and 32 are so deformed as to contact each other and then the caulking loads are measured by the load-cell.

Figure 8:
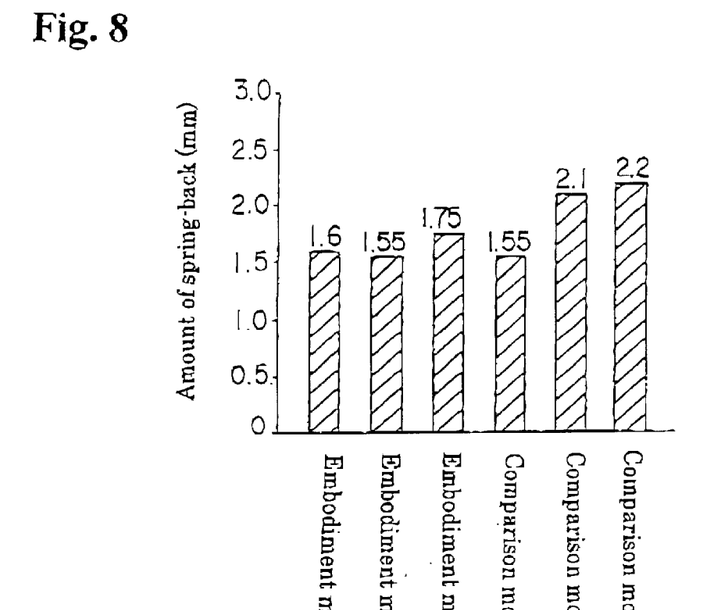
FIG. 8 is a graph showing the differences in the amounts of spring-back between the embodiment models of the present invention and the comparison models.
Figure 9:
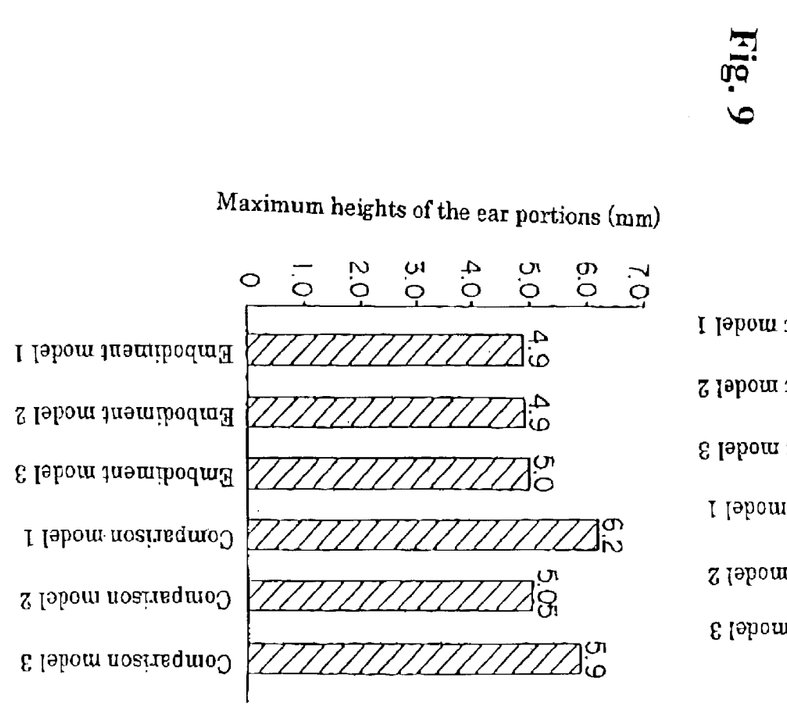
FIG. 9 is a graph showing the differences in the maximum heights of the ear portions of the embodiment models of the present invention and those of the comparison models.
Figure 10:
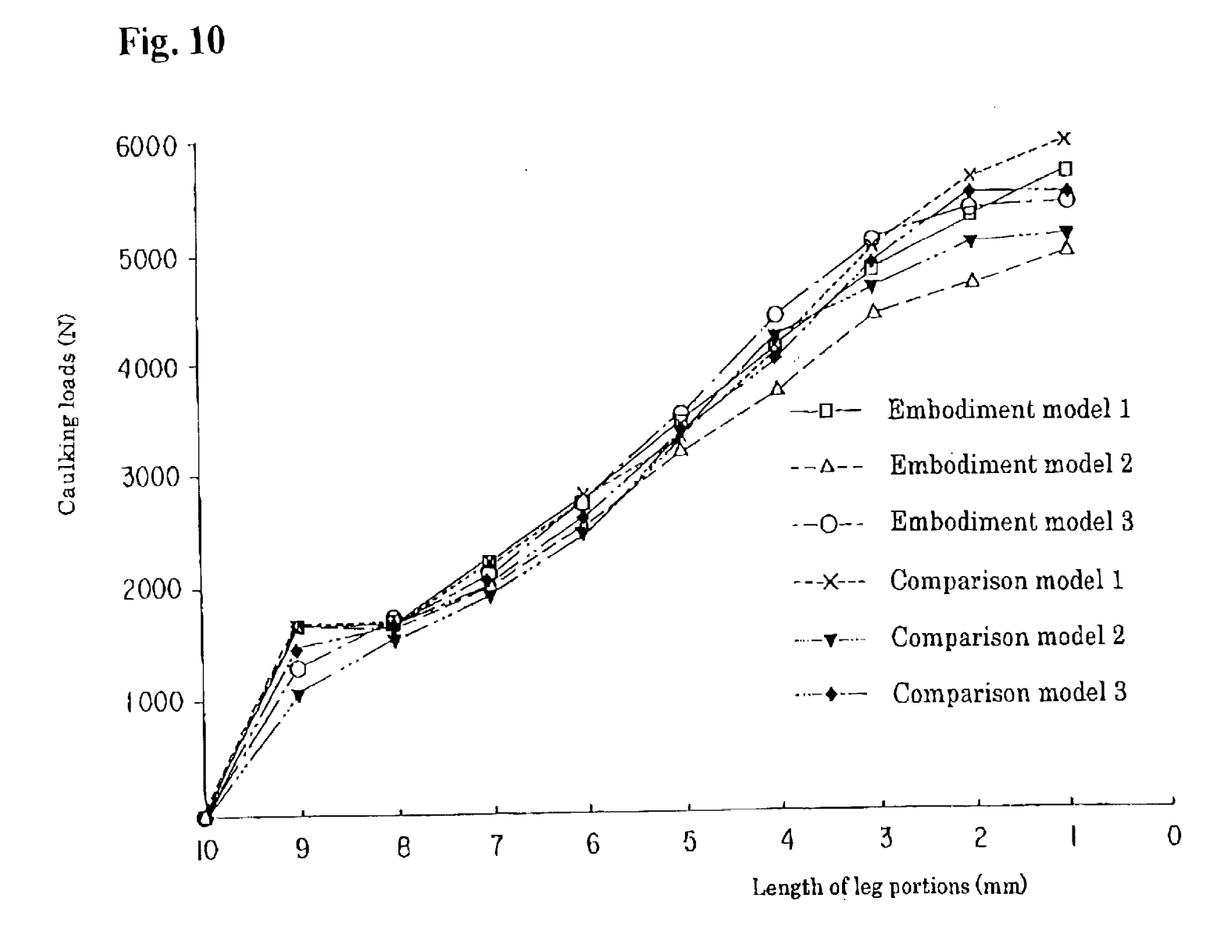
FIG. 10 is a graph showing the patterns of caulking loads of the embodiment models of the present invention and those of the comparison models.

The results of measurements of the amount of spring-back of the ear portions 30 is shown by FIG. 8. The measurement, the purpose of which is to determine the decreases of the clamping power, is made when the clamping claws 54, and 55 of the tester 50 are removed from the caulking portion of the boot-band 10 after the plastic deformation of the ear portion 30 by the clamping claws 54 and 55. The maximum heights of the ear portions after their plastic deformation are shown by FIG. 9. The relation between the caulking load P (measurement: Newton) and the opening dimensions (the distance S between the leg portions 31 and 32) is shown by FIG. 10.

Embodiment Models 1, 2, and 3 and Comparison Models 1, 2, and 3 shown in the graphs are all made of belt-shaped, stainless-steal (SUS304) band-bodies that are 10 mm wide and 1 mm thick. The distance between the leg portions of each model is 10 mm before the plastic deformation. The boot-band 10 of Embodiment Model 1 has the aforementioned rib-like parts 36 and the dowel portion 37 in the ear portion 30. The length L of the rib-like parts 36 is so designed as to be 60% or more of that of the bridge portion 33 in the clamping direction. In addition, no end of the rib-like parts 36 is designed to reach the curved portions 34 and 35.

Embodiment Model 2 is a boot-band that also has rib-like parts 36 and a dowel portion 37, but its rib-like parts, which are longer than those of the Embodiment Model 1, reach the curved portions 34 and 35. In Embodiment Model 2, therefore, the curved portions 34 and 35 are also reinforced by the rib-like parts 36. Embodiment Model 3 is also a boot-band that has the aforementioned rib-like parts 36 and such a dowel portion 37, but the length L of its rib-like parts 36 is 50% of the length Y of the bridge portion 33.

Figure 11:
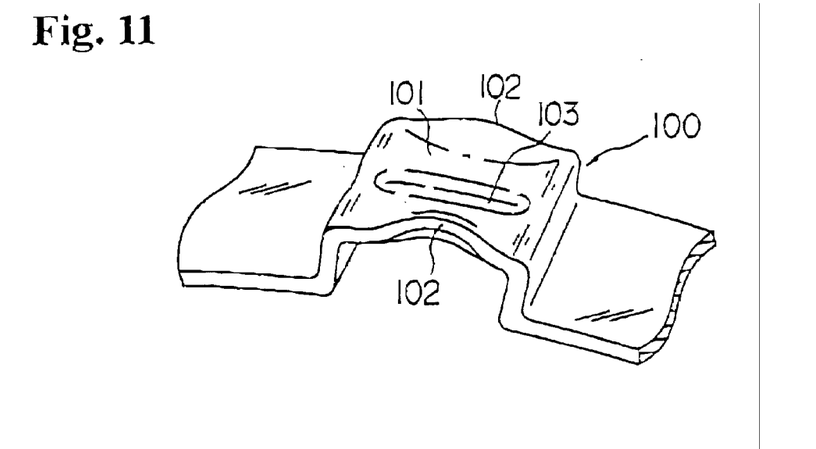
FIG. 11 is a perspective view illustrating the ear portion of Comparison Model 1.

Comparison Model 1, which has an ear portion 100, as shown in FIG. 11, is a boot-band that embodies the concept of the boot-band in Japanese Utility Model Publication No. H2-9195. In other words, it has rib-like parts 102, each of which is outwardly prominent, formed at the opposite ends of the bridge portion 101 along a line that is perpendicular to the circumference of the ear portion 100. Between these outward rib-like parts 102 is formed a dowel portion 103 that inwardly sinks into the ear portion 100.

Figure 12:
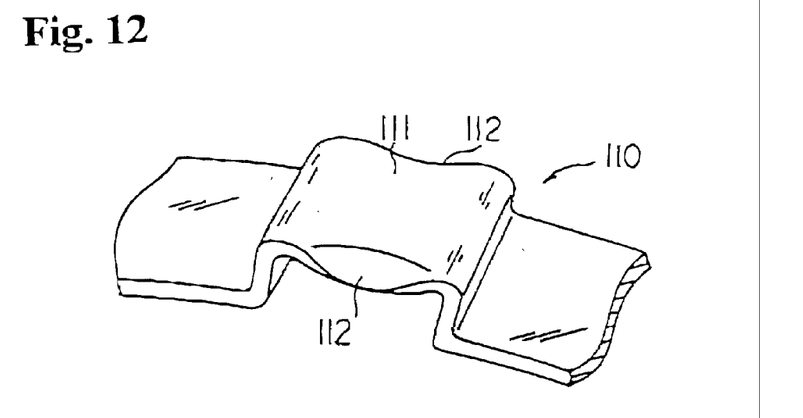
FIG. 12 is a perspective view illustrating the ear portion of Comparison Model 2.

Comparison model 2, shown in FIG. 12, is a boot-band that has rib-like parts 112, which are inwardly prominent into the ear portion 110, formed at the opposite ends of the bridge portion 111 along a line that is perpendicular to the circumference of the ear portion 110.

Figure 13:
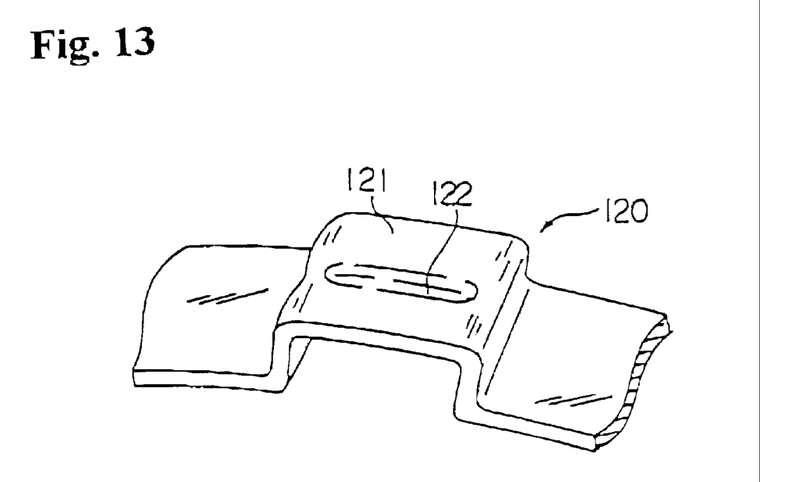
FIG. 13 is a perspective view illustrating the ear portion of Comparison Model 3.

Comparison model 3 is a boot-band that embodies the concept of the aforementioned boot-band of Japanese Patent Publication No. 2538554. In the middle of the bridge portion 121 of the ear portion 120 is formed a shallow, dish-shaped sinking 122, which inwardly sinks into the ear portion, as shown in FIG. 13.

As for the amount of spring-back, as shown by FIG. 8, Embodiment Models 1, 2, and 3, and Comparison Model 1 do not differ much in the amount of spring-back, which means they all are effective in maintaining the binding force. However, Comparison Models 2 and 3 show too much spring-back, which means that they remarkably lower the binding power.

As for the maximum heights of the ear portions, as shown by FIG. 9, those of Embodiment Models 1, 2, and 3 and of Comparison Model 2 are sufficiently low, while Comparison Models 1 and 3 are too prominent. Because of this, a band of these models, when installed in a vehicle, are more likely to interfere with the members around it.

As for the caulking load, as shown by the results, presented in FIG. 10, of the examinations of Embodiment Models 1, 2 and 3, and Comparison Models 1, 2, and 3, when the clamping is strong enough to reduce the distance between the leg portions to around 10 mm to 8 mm, the inner circumferential surface of the boot-band is brought into contact with the outer circumferential surface. Also, a greater caulking load that is enough to reduce the distance between the leg portions to 8 mm or less, compresses the boot in the thickness direction. It is noted, therefore, that the initial loading, which is to keep the distance between the leg portions at 8 mm or more, should be only such as is necessary to deform only the ear portion. Embodiment Models 1 and 2 and Comparison Model 1 show comparatively large initial loading, which means that their ear portions are highly rigid.

When the ear portions are deformed more so as to reduce the distance between the leg portions to 2 mm or less, Comparison Model 1 and Embodiment Model 1 show large caulking loads (or high rigidity of the ear portions), while Embodiment Models 2 and 3 and Comparison Models 2 and 3 show lower caulking loads. This means that, as for Comparison Models 2 and 3 and Embodiment Model 3, the narrower the distance between the leg portions becomes, the less rigidity the whole ear portion shows. As for Embodiment Model 2, probably its caulking load is lower because the rib-like parts 36 and the curved portions 34 and 35 are reinforced and mainly the leg portions are plastically formed when caulked, resulting in an extension of the leg portions and a decrease of its thickness. That is to say, increasing the rigidity of the curved portions 34 and 35 is efficiently reduces spring-back. However, too much rigidity causes the problem that only the leg portions are formed. As described above, balanced rigidity in the bridge portion is important.

With regard to a comprehensive assessment of the amount of spring-back, the maximum heights of the ear portions, and the caulking loads, based on the aforementioned results of the examinations, Embodiment Model 1 is confirmed to be satisfactory for the purpose of the present invention. Embodiment Model 1 is especially favorable in terms of any of the criteria, which are the amount of spring-back, the maximum height of the ear portion, and the caulking loads. High rigidity, which is obtained in Embodiment Model 1, can be obtained when the length of the rib-like portion 36 is 60% or more of that of the bridge portion 33 in the clamping direction.

Needless to say, when the present invention is embodied, it is possible to make necessary changes in its components, such as the shape of the ear portion, the hooking claws or holes (fixing portion), and the band-body. The fixing portion is, for example, need not be a combination of hooking claws and holes as in the aforementioned embodiment. It is possible to design a previously curled band-body, with its inner and outer overlap portions being connected by the fixing portion, that is to be put on the clamped member from its end side.

POSSIBILITY OF INDUSTRIAL UTILIZATION

With the invention as set forth in claim 1, since (1) the rib-like parts which protrude inwardly of the ear portion in an arc-shape and are set at such a length that is 60% or more of the length of the bridge portion in the clamping direction but not more than the length obtained by subtracting the length of the curved portions at the opposite ends of the bridge portion from the length of the bridge portion in the clamping direction, and (2) the dowel portion whose length is as long as, or longer than, the length of the rib-like parts are formed at the ear portion, so as to prevent rapid change in rigidity from the leg portions to the bridge portion, the leg portions do not locally or excessively plastically deformed when the ear portion is plastically deformed, whereby damage of the leg portions is surely prevented. Also, it is possible (a) to lower the prominence of the ear portion after the ear portion is deformed by the clamping tool, (b) to increase the rigidity of the ear portion to maintain a small amount of spring-back and a desired level of binding force, and (c) to reduce the amount of secured clearance between the band and its peripheral members. The maximum height of the ear portion after its plastic deformation can be kept small even when the bridge portion has a large length, because the shape of the bridge portion is almost flat. Thereby, it is possible to obtain a larger clamping stroke by forming a longer ear portion, as well as to reduce the amount of secured clearance with members around the band.

Description of Reference Numbers Used in the drawings

10 boot-band
11 band-body
17 clamped member
21 outer overlap portion of band-body
22 inner overlap portion of band-body
30 ear portion
31 □32 leg portion of ear portion
33 leg portion of ear portion
36 rib-like part of ear portion
37 dowel portion of ear portion
40 hole (fixing portion)
41 hooking claw (fixing portion)

What is claimed is:

1. A belt-shaped boot-band, having a metal band-body curled into a ring shape and arranged on a clamped member, the boot-band comprising:

fixing portions to fix an outer overlap portion of the band-body on an inner overlap portion thereof;

an ear portion having two leg portions that outwardly protrude and an arc-shaped curved portion located between the two leg portions and a bridge portion to link the two leg portions and the bridge portion, wherein the bridge portion connects the two leg portions outwardly to plastically bend to reduce the circumference of the boot-band to clamp the band-body;

rib-like parts located in the ear portion, each rib-like part being inwardly bent into the leg portion at opposite ends of the bridge portion along a line that is perpendicular to the circumference of the boot-band;

a dowel portion located between the rib-like parts that inwardly sinks into the ear portion to extend in a circumferential direction of the band-body, wherein the rib-like parts are arc-shaped such that their prominence, inwardly protruding into the ear portion, increases toward a middle of the bridge portion in the clamping direction, and wherein the rib-like parts have a length that is 60% or more of the bridge portion in the clamping direction but not more than a length obtained by subtracting a length of a curved portion from the length of the bridge portion in a clamping direction, and wherein the length of the dowel portion is not less than that of the rib-like parts.

* * * * *